(12) United States Patent
Kagawa (10) Patent No.: US 12,013,997 B2
(45) Date of Patent: Jun. 18, 2024

(54) IN-CELL TOUCH PANEL (71) Applicant: Sharp Display Technology Corporation, Kameyama (JP)

(72) Inventor: Haruhito Kagawa, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/225,975

(22) Filed: Jul. 25, 2023

(65) Prior Publication Data
US 2024/0045532 A1    Feb. 8, 2024

(30) Foreign Application Priority Data

Aug. 3, 2022   (JP) .................... 2022-124146

(51) Int. Cl.
| G06F 3/041 | (2006.01) |
| G02F 1/1333 | (2006.01) |
| G02F 1/1335 | (2006.01) |
| G06F 3/044 | (2006.01) |

(52) U.S. Cl.
CPC ........ *G06F 3/0412* (2013.01); *G02F 1/13338* (2013.01); *G02F 1/133512* (2013.01); *G02F 1/133528* (2013.01); *G02F 2202/28* (2013.01); *G06F 3/0446* (2019.05); *G06F 2203/04107* (2013.01)

(58) Field of Classification Search
CPC ............... G06F 3/0412; G06F 3/0446; G06F 2203/04107; G02F 1/13338; G02F 1/133512; G02F 1/133528; G02F 2202/28
See application file for complete search history.

(56) References Cited

U.S. PATENT DOCUMENTS

| 2013/0033450 | A1* | 2/2013 | Coulson ................. G06F 3/041 345/174 |
| 2014/0016043 | A1* | 1/2014 | Chen .................... H04N 9/3197 349/12 |
| 2018/0095324 | A1* | 4/2018 | Li .......................... G06F 3/0412 |
| 2018/0252955 | A1* | 9/2018 | Kurasawa ............ G06F 3/0443 |
| 2018/0314095 | A1* | 11/2018 | Yi ....................... G02F 1/13338 |
| 2020/0133052 | A1* | 4/2020 | Gu ........................ G02F 1/1339 |
| 2020/0241372 | A1* | 7/2020 | Yoshida ............ G02F 1/133382 |
| 2020/0343314 | A1* | 10/2020 | Nakamura ............... H01Q 1/38 |
| 2023/0359305 | A1* | 11/2023 | Vaze ..................... G06F 3/0443 |

FOREIGN PATENT DOCUMENTS

| JP | 2008-209529 A | 9/2008 |
| JP | 2009-086184 A | 4/2009 |
| JP | 2013-142194 A | 7/2013 |
| JP | 6495541 B2 | 4/2019 |

* cited by examiner

*Primary Examiner* — Ryan A Lubit
(74) *Attorney, Agent, or Firm* — ScienBiziP, P.C.

(57) ABSTRACT

An in-cell touch panel includes a touch electrode, a shielding layer that is conductive and that is disposed between the touch electrode and the touch surface, a conductive layer that is electrically connected to the shielding layer, and a conductive member and a wiring portion that connect the conductive layer to a reference potential. At least part of the shielding layer is disposed so as to overlap a touch detection region. At least part of the conductive layer is disposed so as to overlap a frame region. A sheet resistance value of the conductive layer is lower than a sheet resistance value of the shielding layer.

8 Claims, 9 Drawing Sheets

IN-CELL TOUCH PANEL

BACKGROUND

1. Field

The present disclosure relates to an in-cell touch panel.

2. Description of the Related Art

An in-cell touch panel is conventionally known. For example, Japanese Unexamined Patent Application Publication No. 2013-142194 discloses an in-cell touch panel that has a transparent conductive film. In this in-cell touch panel, a thin-film transistor (TFT) substrate, a liquid crystal layer, a color filter glass, a transparent conductive film, an adhesive layer, and a cover are stacked in that order. The sheet resistance of the transparent conductive film is $10^7$ to $10^9 \Omega$/sq.

A transparent conductive film (shielding layer) is used in in-cell touch panels for electromagnetic shielding, as described in Japanese Unexamined Patent Application Publication No. 2013-142194 above. Here, when the resistance of the transparent conductive film is low, the signal strength at the time of sensing touching decreases, and accordingly the sensitivity of detecting touching deteriorates. In order to deal with this, in Japanese Unexamined Patent Application Publication No. 2013-142194, the sheet resistance of the transparent conductive film is set to $10^7$ to $10^9 \Omega$/sq. which is high, thereby suppressing deterioration in sensitivity of detecting touching.

However, due to the sheet resistance of the transparent conductive film being high in the in-cell touch panel according to Japanese Unexamined Patent Application Publication No. 2013-142194, when the transparent conductive film is charged with static electricity coming from outside, the duration of time for the static electricity to be discharged is long. That is to say, there is a problem in that the effect of static electricity on display and the effect of static electricity on touch detection are large. It is desirable to provide an in-cell touch panel that is capable of reducing the effect of static electricity on display and the effect of static electricity on touch detection while suppressing deterioration in sensitivity of detecting touching.

SUMMARY

According to an aspect of the present disclosure, there is provided an in-cell touch panel having a touch surface that is touched by an indicator. The in-cell touch panel includes a touch electrode, a shielding layer that is conductive and that is disposed between the touch electrode and the touch surface, a conductive layer that is electrically connected to the shielding layer, and wiring that connects the conductive layer to a reference potential. The touch surface has a touch detection region that, when touched by the indicator, detects the touch by the touch electrode, and a frame region that is disposed on an outer side of the touch detection region. At least part of the shielding layer is disposed so as to overlap the touch detection region in plan view. At least part of the conductive layer is disposed so as to overlap the frame region in plan view. A sheet resistance value of the conductive layer is lower than a sheet resistance value of the shielding layer.

DESCRIPTION OF THE EMBODIMENTS

Embodiments of the present disclosure will be described below with reference to the drawings. Note that the present disclosure is not limited to the following embodiments, and design alterations may be made as appropriate within a range fulfilling the configuration of the present disclosure. Also, in the following description, parts that are the same or parts that have similar functions may be denoted by the same symbols throughout different drawings, and repetitive description thereof may be omitted. Also, various configurations described in the embodiments and modifications thereof may be combined as appropriate or may be altered without departing from the spirit of the present disclosure. In the drawings which will be referenced below, configurations may be simplified or schematized in illustration, and some of the constituent members may be omitted, in order to facilitate understanding of the description. Also, the dimensional ratios between the constituent members illustrated in the drawings do not necessarily indicate actual dimensional ratios.

First Embodiment

Figure 1:
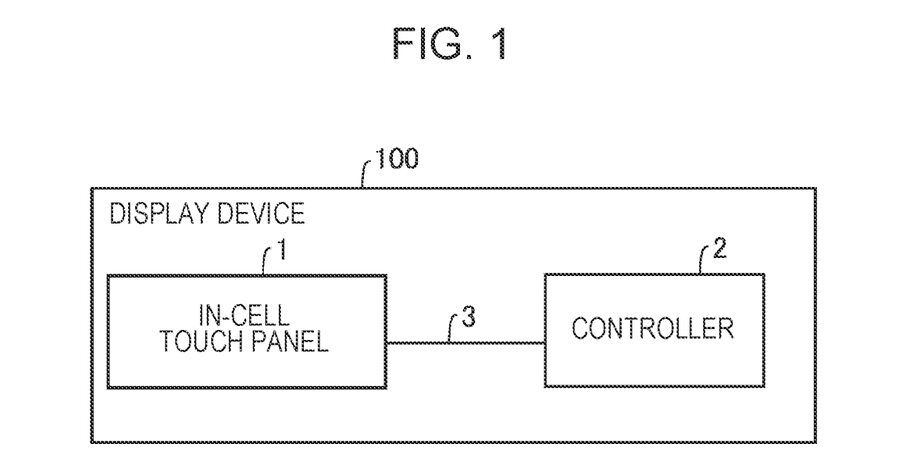
FIG. 1 is a block diagram illustrating a configuration of a display device including an in-cell touch panel according to a first embodiment.

FIG. 1 is a block diagram illustrating a configuration of a display device 100 including an in-cell touch panel 1 according to a first embodiment. The display device 100 is configured as, for example, a smartphone, a tablet terminal, a smartwatch, an in-vehicle information display, a personal computer, or the like. The display device 100 includes the in-cell touch panel 1, a controller 2, and a wiring portion 3. The controller 2 is connected to the in-cell touch panel 1 via the wiring portion 3. Also, the in-cell touch panel 1 functions to detect touches by an indicator (finger or stylus), and also functions as a display panel to display video or images. The controller 2 executes various types of control processing in the display device 100 on the basis of results of touch detection acquired from the in-cell touch panel 1. The wiring portion 3 is, for example, a flexible printed circuit.

Figure 2:
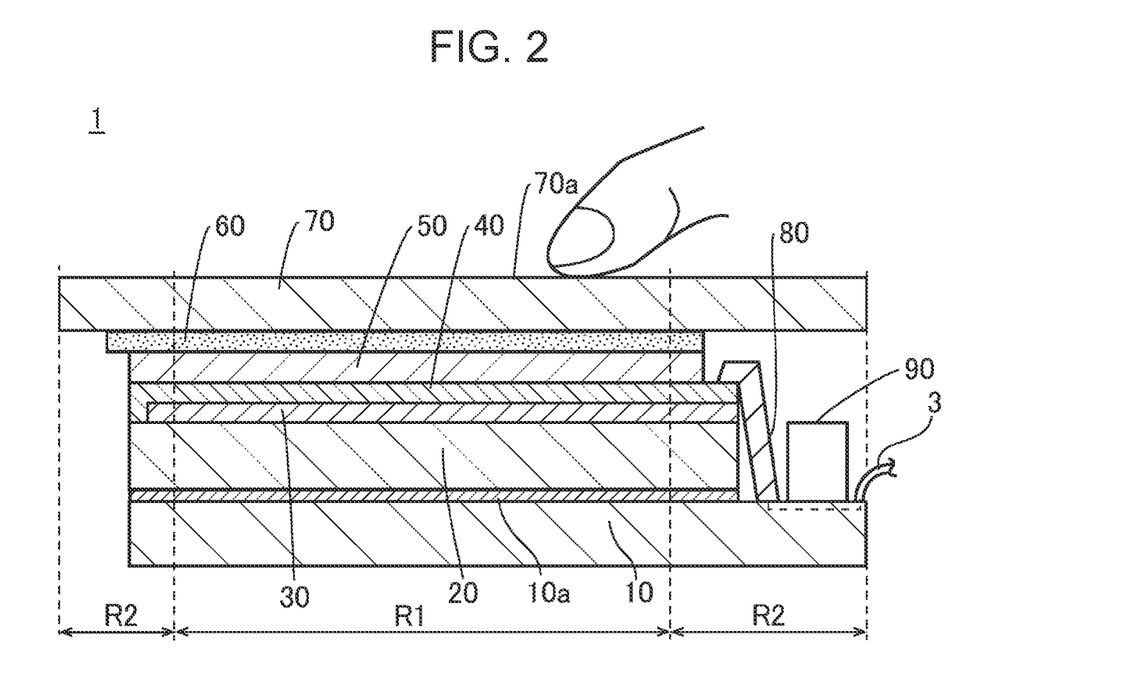
FIG. 2 is a cross-sectional view of the in-cell touch panel according to the first embodiment.

FIG. 2 is a cross-sectional view of the in-cell touch panel 1 according to the first embodiment. As illustrated in FIG. 2, the in-cell touch panel 1 includes a thin-film transistor substrate 10 (hereinafter referred to as "TFT substrate 10"), a liquid crystal layer 10a, a color filter glass 20 (hereinafter referred to as "CF glass 20"), a shielding layer 30, a conductive layer 40, a polarizer 50, an adhesive layer 60, a cover 70, conductive members 80, and a driver circuit 90. The in-cell touch panel 1 detects touches made by the indicator as to a surface of the cover 70 (hereinafter referred to as "touch surface 70a"). Note that the term "touch" is a broad concept including not only the indicator being in contact with the touch surface 70a, but also the indicator being located at a position in close proximity to the touch surface 70a without contact therewith. The TFT substrate 10, the liquid crystal layer 10a, the CF glass 20, the shielding layer 30, the conductive layer 40, the polarizer 50, the adhesive layer 60, and the cover 70 are arranged in order toward the touch surface 70a. The polarizer 50 transmits light having a predetermined polarization direction. The adhesive layer 60 is made of, for example, an optical clear adhesive (OCA) or the like, and bonds the polarizer 50 and the cover 70 together. The cover 70 is, for example, a cover glass. The TFT substrate 10 and the CF glass are, for example, substrates including at least one of a glass material and a resin material.

Figure 3:
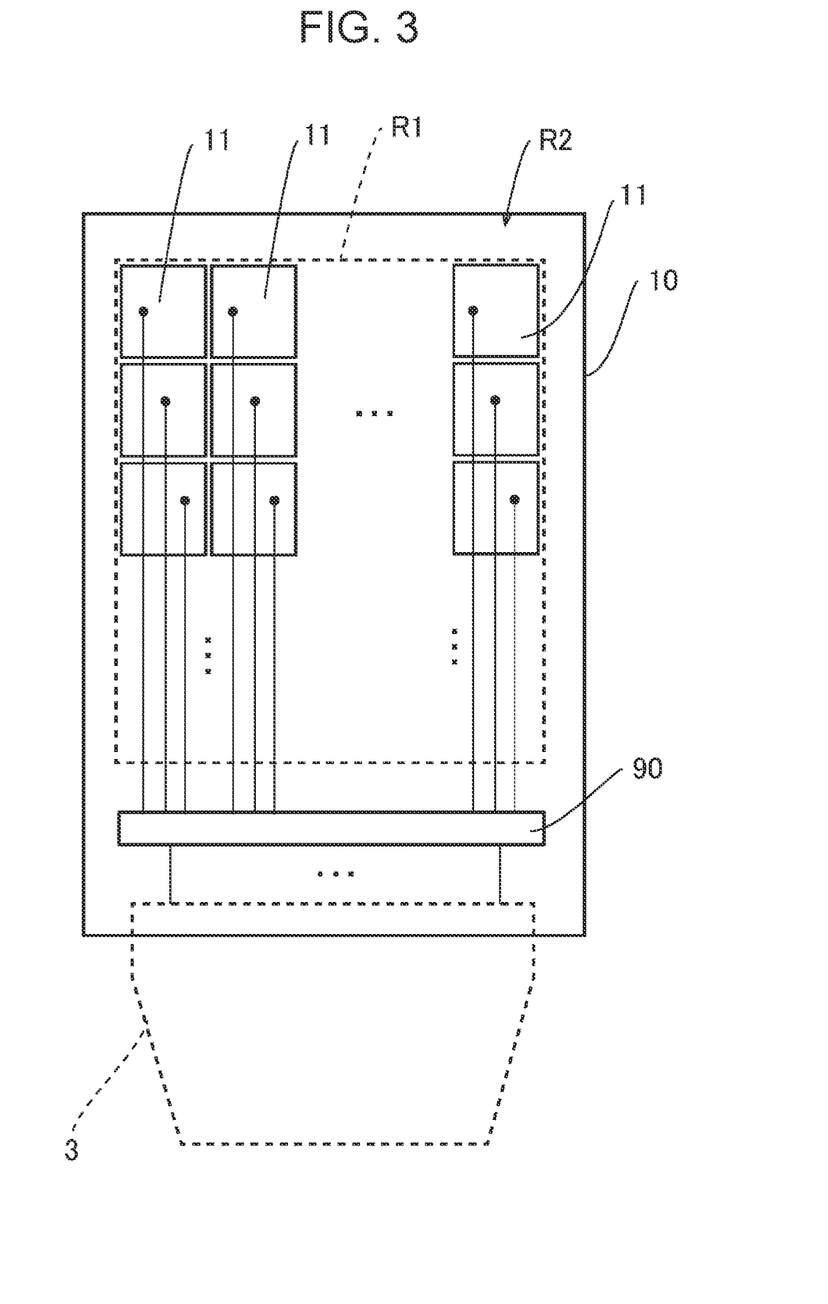
FIG. 3 is a diagram for describing the positions where touch electrodes are disposed on a thin-film transistor (TFT) substrate.

FIG. 3 is a diagram for describing the positions where touch electrodes 11 are disposed on the TFT substrate 10. As illustrated in FIG. 3, a plurality of touch electrodes 11 are formed on the TFT substrate 10. For example, the plurality of touch electrodes 11 are disposed in a matrix form. The plurality of touch electrodes 11 are each connected to the driver circuit 90. The driver circuit 90 detects a change in static capacitance of each of the plurality of touch electrodes 11, and transmits results of detection to the controller 2 (see FIG. 1) via the wiring portion 3. The driver circuit 90 is an integrated circuit disposed on the TFT substrate 10. Here, the touch surface 70a has a touch detection region R1 which, when touched by the indicator, detects the touch by the touch electrodes 11, and a frame region R2 that is disposed on an outer side of the touch detection region R1. In the first embodiment, the frame region R2 surrounds the touch detection region R1. In the first embodiment, the touch detection region R1 is oblong in a longitudinal direction, and the in-cell touch panel 1 is a portrait type touch panel. The plurality of touch electrodes 11 are, for example, transparent electrodes made of indium tin oxide (ITO). Note that the plurality of touch electrodes 11 may be configured as transparent electrodes made of indium zinc oxide (IZO). For example, the plurality of touch electrodes 11 include ITO. For example, the plurality of touch electrodes 11 are disposed so as to face pixel electrodes connected to thin-film transistors (not illustrated), and also serve as a common electrode that generates an electric field in the liquid crystal layer 10a. Note that in the present embodiment, an example is illustrated in which the in-cell touch panel 1 is configured as a portrait type touch panel, but the present disclosure is not limited to this. For example, the in-cell touch panel 1 may be configured as a landscape type touch panel.

Figure 4:
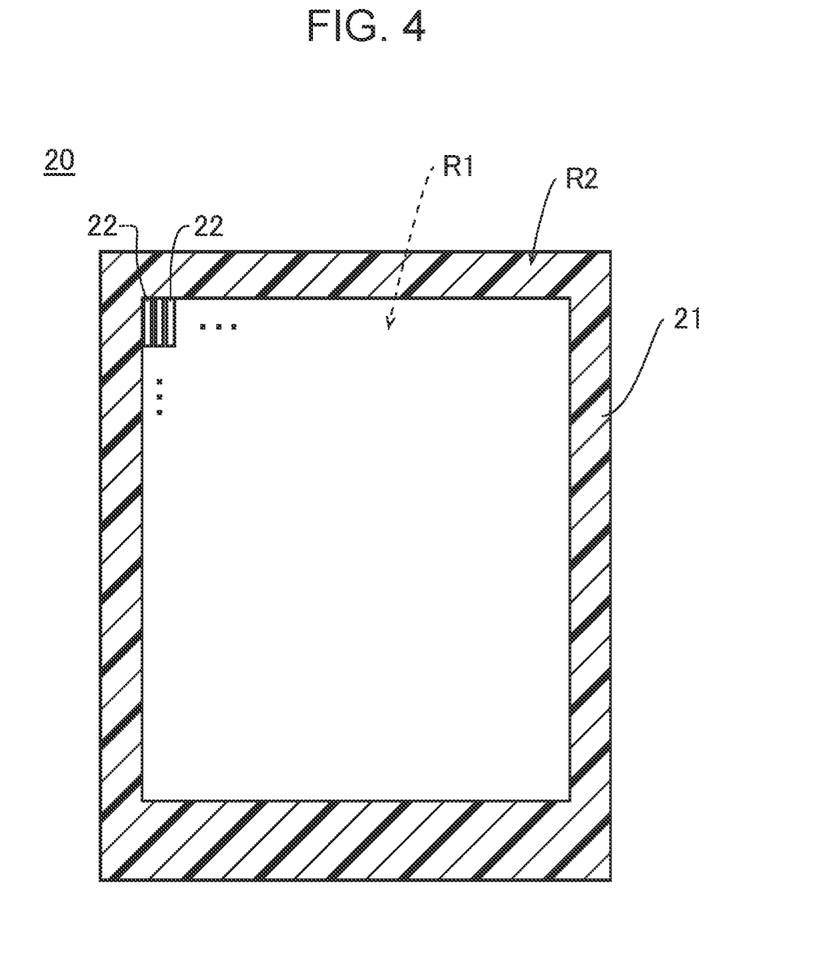
FIG. 4 is a diagram for describing the position where a black matrix is disposed on a color filter (CF) glass.

FIG. 4 is a diagram for describing the position where a black matrix 21 is disposed on the CF glass 20. As illustrated in FIG. 4, the black matrix 21 is disposed on the CF glass 20 in a frame-like shape that is rectangular in plan view. The black matrix 21 may be disposed so as to cover the frame region R2. Accordingly, light from a backlight (not illustrated) is shielded in the frame region R2, and no image is displayed. That is to say, the frame region R2 is a non-display region where images are not displayed. Also, a plurality of color filters 22 are disposed in the touch detection region R1 of the CF glass 20. The color filters 22 transmit, out of light that has passed through the liquid crystal layer 10a, light of a predetermined color. Note that the black matrix 21 may be disposed between the plurality of color filters 22, although this is not illustrated in FIG. 4. The touch detection region R1 corresponds to a display region where images are displayed. The black matrix 21 and the color filters 22 include, for example, a resin material that has insulating properties.

Figure 5:
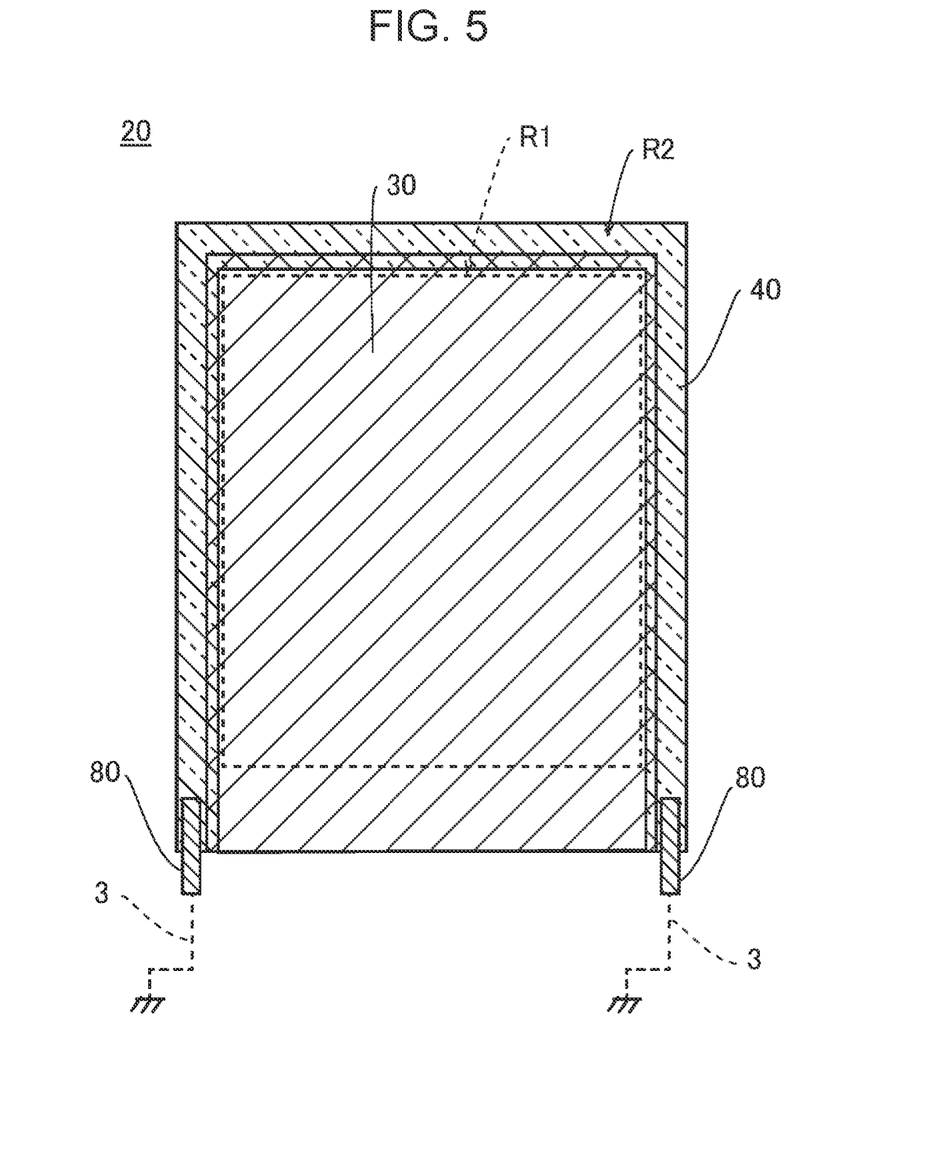
FIG. 5 is a diagram for describing the positions where a shielding layer and a conductive layer are disposed on the CF glass.

FIG. 5 is a diagram for describing the positions where the shielding layer 30 and the conductive layer 40 are disposed on the CF glass 20. As illustrated in FIG. 5, the shielding layer 30 is disposed so as to cover the touch detection region R1. In other words, the shielding layer 30 is disposed so as to overlap the plurality of touch electrodes 11 (see FIG. 3) in plan view. Also, the shielding layer 30 is formed so as to overlap a portion of the frame region R2 on the driver circuit 90 side (the lower portion in the page of FIG. 5), and a portion of the frame region R2 near the touch detection region R1, in plan view. Accordingly, the shielding layer 30 shields noise coming from the touch surface 70a side of the shielding layer 30. The shielding layer 30 is, for example, a transparent electrode made of ITO. The shielding layer 30 may include, for example, ITO. Note that the shielding layer 30 may be configured as a transparent electrode made of IZO.

As illustrated in FIG. 5, the conductive layer 40 is disposed so as to overlap a portion of the frame region R2 on an opposite side of the touch detection region R1 from the driver circuit 90 (the upper portion in the page of FIG. 5), and portions of the frame region R2 on both right and left sides of the touch detection region R1 in the page, in plan view. Accordingly, in the first embodiment, the conductive layer 40 may have a U shape in plan view. For example, the conductive layer 40 is only disposed in the frame region R2. Also, at least part of the conductive layer 40 is disposed so as to overlap the shielding layer 30 in a portion of the frame region R2 near the touch detection region R1. The portion of the conductive layer 40 overlapping the shielding layer 30 is in contact with the shielding layer 30. Accordingly, the conductive layer 40 is electrically connected to the shielding layer 30. Further, in the first embodiment, the conductive layer 40 and the shielding layer 30 are directly connected, and accordingly another member for electrically connecting the conductive layer 40 and the shielding layer 30 is unnecessary.

The conductive layer 40 is made of, for example, the same material as the shielding layer 30. The conductive layer 40 is, for example, a transparent electrode made of ITO. Note that the conductive layer 40 may be configured as a transparent electrode made of IZO. In the first embodiment, the conductive layer 40 may include ITO. Generally, a process of manufacturing the in-cell touch panel 1 includes a step of forming transparent electrodes including ITO (the touch electrodes 11 in the first embodiment). In contrast, according to the first embodiment, at the time of film formation (e.g., vapor deposition) of the shielding layer 30 and the conductive layer 40, an existing device for film formation of transparent electrodes (touch electrodes 11) can be used, and accordingly a device for manufacturing the in-cell touch panel 1 can be shared among steps. When a conductive layer disposed in the frame region R2 is formed from conductive paste or carbon resin, a thickness of the conductive layer is large, and an air layer (space) is created in the touch detection region R1. In contrast, according to the first embodiment, forming the conductive layer 40 from ITO enables the thickness thereof to be reduced, and an air layer (space) can be suppressed from being created in the touch detection region R1.

Figure 6:
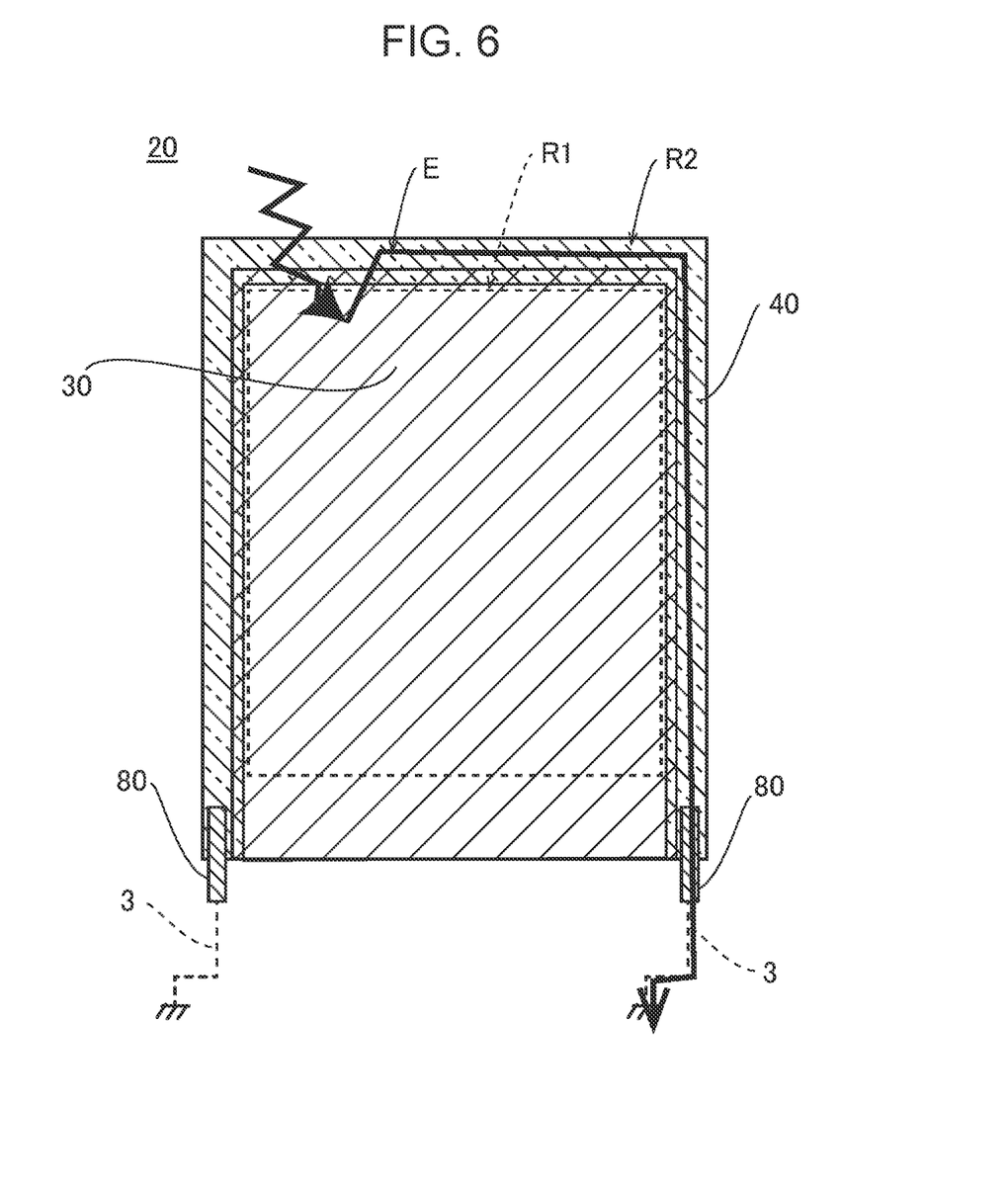
FIG. 6 is a diagram schematically illustrating a path through which static electricity passes when the static electricity enters the shielding layer.

For example, the conductive members 80 are disposed at positions of the frame region R2 that overlap the portion of the driver circuit 90 side (the lower portion in the page) in plan view. FIG. 6 is a diagram schematically illustrating a path through which static electricity E passes when the static electricity E enters the shielding layer 30. As illustrated in FIG. 6, the wiring portion 3 is connected to a reference potential (e.g., a ground potential). The conductive layer 40 is electrically connected to the ground potential via the conductive members 80 and the wiring portion 3. The conductive members 80 are made from, for example silver paste. The conductive members 80 are connected to the conductive layer 40 and the wiring portion 3. When static electricity E enters the shielding layer 30 or the conductive layer 40, the static electricity E is released outside of the in-cell touch panel 1 (ground potential) via the wiring portion 3. Note that the conductive members 80 may be made of a metal other than silver paste (e.g., copper or gold). For example, two conductive members 80 may be provided.

In the portrait-type in-cell touch panel 1, the distance between the conductive members 80 at the lower portion in the page and the shielding layer 30 at the upper portion in the page is larger than that in a case in which the in-cell touch panel 1 is not a portrait type. Note that the conductive members 80 are not disposed in the portion of the frame region R2 at the upper portion in the page, in order to form the frame region R2 as a narrow frame. Accordingly, when static electricity enters the shielding layer 30 at the upper portion in the page, the path to the conductive members 80 is long.

Accordingly, in the first embodiment, a sheet resistance value r1 of the conductive layer 40 is smaller than a sheet resistance value r2 of the shielding layer 30 ($1.0 \times 10^7 \Omega$ or higher and $1.0 \times 10^9 \Omega$ or lower). For example, the sheet resistance value r1 is a value in a range of $1.0 \times 10 \Omega$ ($\Omega$/sq.) or higher and $1.0 \times 10^3 \Omega$ or lower. For example, the sheet resistance value r1 is $1.0 \times 10^2 \Omega$. For example, the sheet resistance value r2 is $1.0 \times 10^8 \Omega$. For example, the sheet resistance value r1 is set to be lower than the sheet resistance value r2 by making the thickness of the conductive layer 40 larger than the thickness of the shielding layer 30. Note that this is not restrictive, and the sheet resistance value r1 may be set to be lower than the sheet resistance value r2 by changing the composition ratio of the material for the conductive layer 40 with respect to the composition ratio of the material for the shielding layer 30 by a known method.

Due to the sheet resistance value r1 being lower than the sheet resistance value r2, even when static electricity E enters the shielding layer 30, the static electricity E travels to the conductive layer 40, which has a sheet resistance value r1 smaller than the sheet resistance value r2 of the shielding layer 30, as illustrated in FIG. 6. The static electricity E then passes through the conductive layer 40 disposed in the frame region R2, and reaches the conductive members 80. The static electricity E is then dissipated outside of the in-cell touch panel 1 (ground potential) via the conductive members 80 and the wiring portion 3. Accordingly, the static electricity E is quickly dissipated outside of the in-cell touch panel 1 without the static electricity E being retained in the shielding layer 30 for a long period of time.

Also, according to the first embodiment, the shielding layer 30 of which the sheet resistance value r2 is higher is disposed at a position overlapping the touch detection region R1 in plan view, and accordingly deterioration in sensitivity of detecting touching can be suppressed. Also, the conductive layer 40 of which the sheet resistance value r1 is lower is electrically connected to the shielding layer 30. Accordingly, even when the shielding layer 30 is charged with static electricity, the static electricity charged where the sheet resistance is the sheet resistance value r2 can be quickly discharged via the ground potential via the conductive layer 40 of which the sheet resistance is lower. Also, at least part of the conductive layer 40 is disposed so as to overlap the frame region R2 in plan view, and the low sheet resistance value r1 of the conductive layer 40 does not impede the state in which the resistance value r2 of the shielding layer 30 is high, whereby the effect on touch detection can be reduced. As a result of the above, the effect of static electricity on display and the effect of static electricity on touch detection can be reduced while suppressing deterioration in sensitivity of detecting touching.

Second Embodiment

Figure 7:
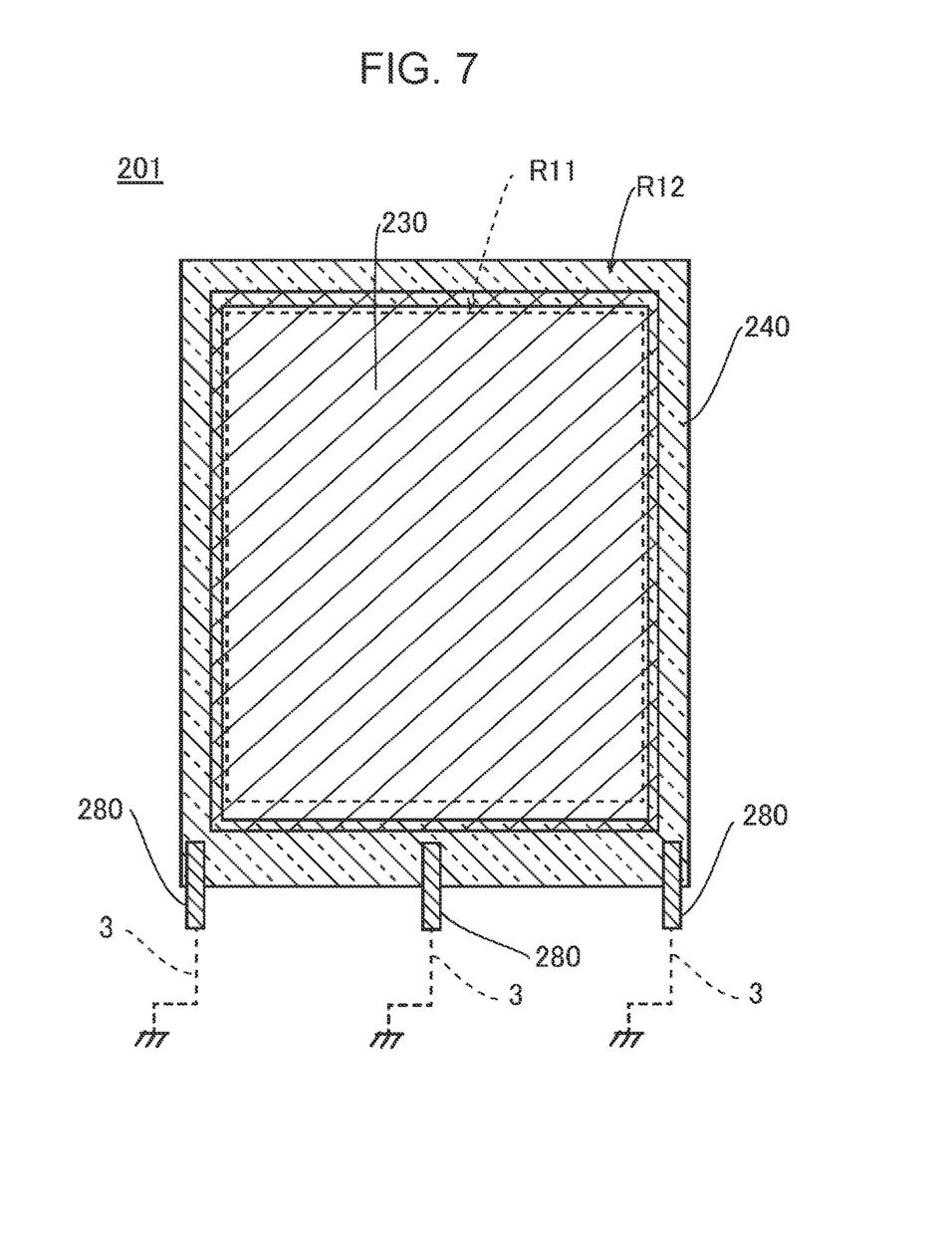
FIG. 7 is a plan view of an in-cell touch panel according to a second embodiment.

A configuration of an in-cell touch panel 201 according to a second embodiment will be described with reference to FIG. 7. FIG. 7 is a plan view of the in-cell touch panel 201 according to the second embodiment. Note that configurations that are the same as those in the first embodiment will be denoted by the same symbols as in the first embodiment, and description will be omitted.

As illustrated in FIG. 7, in the second embodiment, a conductive layer 240 of the in-cell touch panel 201 may have a rectangular frame-like shape in plan view, in a frame region R12. That is to say, the conductive layer 240 surrounds a touch detection region R11 in plan view. The in-cell touch panel 201 includes one or more conductive members 280 connected to the conductive layer 240 (three conductive members 280 are illustrated in FIG. 7). According to the second embodiment, the conductive layer 240 is formed on all sides of the frame region R12 having a frame-like shape (in particular, the conductive layer 240 is formed at the lower portion in the page), and accordingly the number of connection points between the conductive members 280 and the conductive layer 240 can be increased in the frame region R12. As a result, static electricity can be released from the conductive layer 240 to the conductive members 280 more readily. Note that in a case in which the in-cell touch panel 201 has a small configuration, providing one conductive member 280 at the lower portion in the page is sufficient, and in this case, the material for the conductive member 280 (e.g., silver paste) can be reduced. Other configurations and effects of the second embodiment are the same as those of the first embodiment.

Third Embodiment

Figure 8:
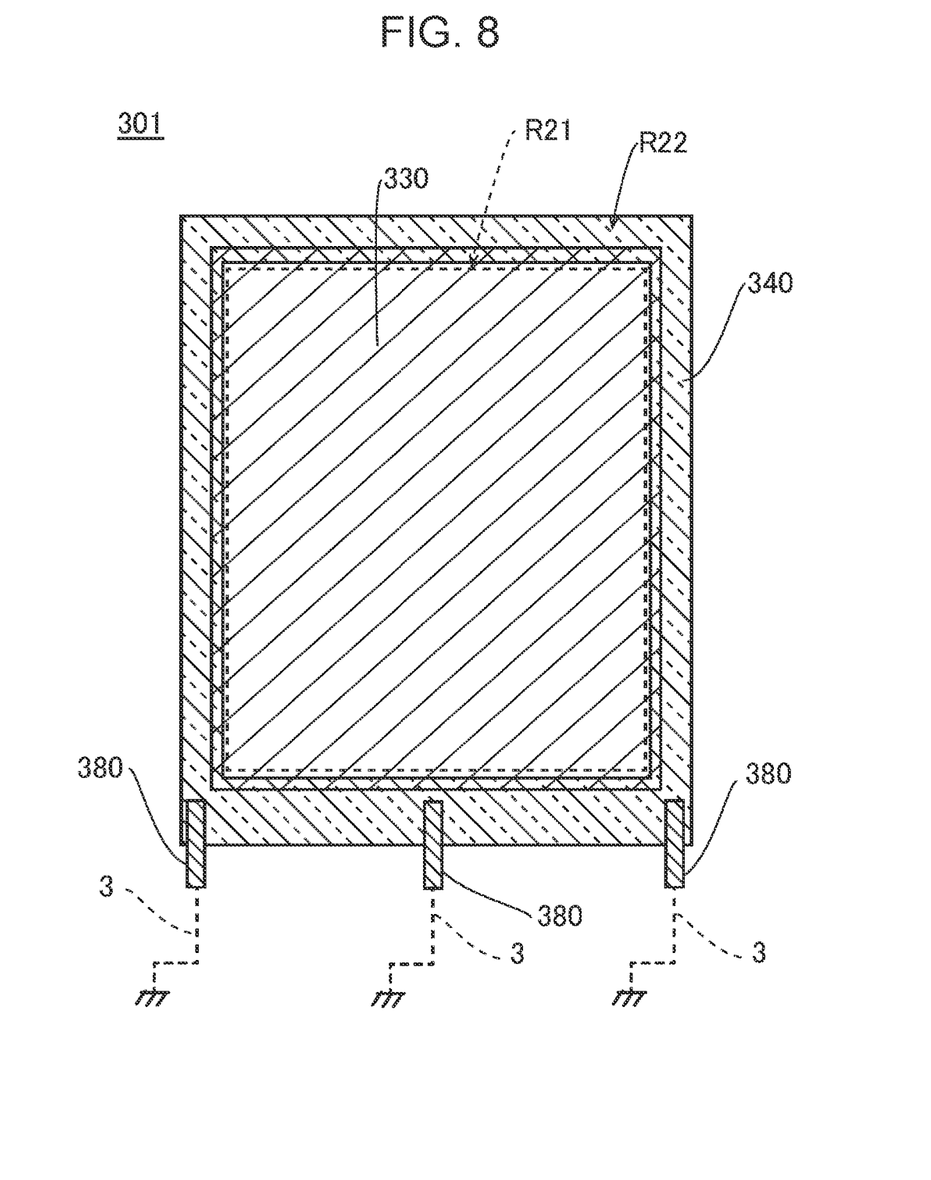
FIG. 8 is a plan view of an in-cell touch panel according to a third embodiment.
Figure 9:
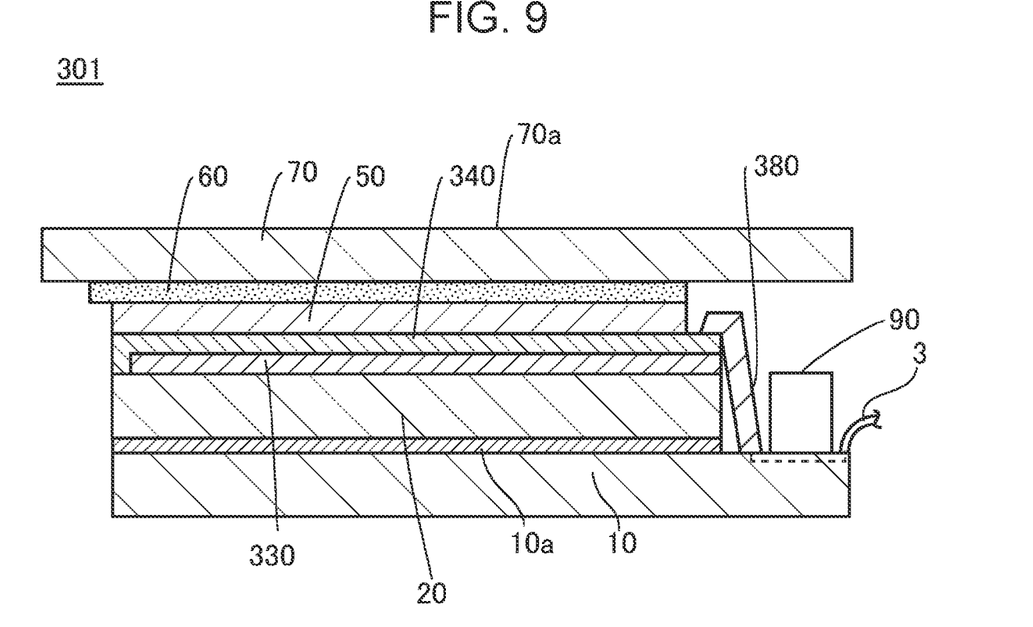
FIG. 9 is a cross-sectional view of the in-cell touch panel according to the third embodiment.

A configuration of an in-cell touch panel 301 according to a third embodiment will be described with reference to FIGS. 8 and 9. FIG. 8 is a plan view of the in-cell touch panel 301 according to the third embodiment. FIG. 9 is a cross-sectional view of the in-cell touch panel 301 according to the third embodiment. Note that configurations that are the same as those in the first or second embodiments will be denoted by the same symbols as in the first or second embodiments, and description will be omitted.

As illustrated in FIG. 8, the in-cell touch panel 301 includes a shielding layer 330 and a conductive layer 340. The conductive layer 340 of the in-cell touch panel 301 may have a rectangular frame-like shape in plan view, in a frame region R22. That is to say, the conductive layer 340 surrounds a touch detection region R21 in plan view. In the third embodiment, the shielding layer 330 and the conductive layer 340 may be made of adhesive layers that have conductivity. For example, the shielding layer 330 and the conductive layer 340 are made of a conductive adhesive obtained by adding a conductive material to an OCA. For example, a metal powder may be used as the conductive material. A sheet resistance value r11 of the conductive layer 340 may be lower than a sheet resistance value r12 of the shielding layer 330. The sheet resistance value r11 is a value in a range of $1.0 \times 10 \Omega$ or higher and $1.0 \times 10^3 \Omega$ or lower. For example, the sheet resistance value r11 is $1.0 \times 10^2 \Omega$. Also, the sheet resistance value r12 is a value in a range of $1.0 \times 10^7 \Omega$ or higher and $1.0 \times 10^9 \Omega$ or lower. For example, the sheet resistance value r12 is $1.0 \times 10^8 \Omega$.

As illustrated in FIG. 9, the shielding layer 330 and the conductive layer 340 are disposed between the CF glass and the polarizer 50. The shielding layer 330 and the conductive layer 340 bond the CF glass 20 and the polarizer 50 together. The conductive layer 340 is disposed on the shielding layer 330, and is in contact with the shielding layer 330. The conductive layer 340 is also connected to a conductive member 380 connected to the ground potential via the wiring portion 3. Accordingly, even when static electricity enters the shielding layer 330, the static electricity can be released outside of the in-cell touch panel 301 via the conductive layer 340 and the conductive member 380.

Here, a process of joining films while transporting panels from roll to roll (roll-to-roll process) enables the load involved in manufacturing (time, costs, etc.) to be reduced as compared with methods of film formation. According to the third embodiment, the shielding layer 330 and the conductive layer 340 can be formed by a roll-to-roll process, and accordingly the load involved in manufacturing can be reduced in comparison with cases in which film formation of the shielding layer and the conductive layer are performed. Other configurations and effects of the third embodiment are the same as those of the first or second embodiments.

Modification of Third Embodiment

Figure 10:
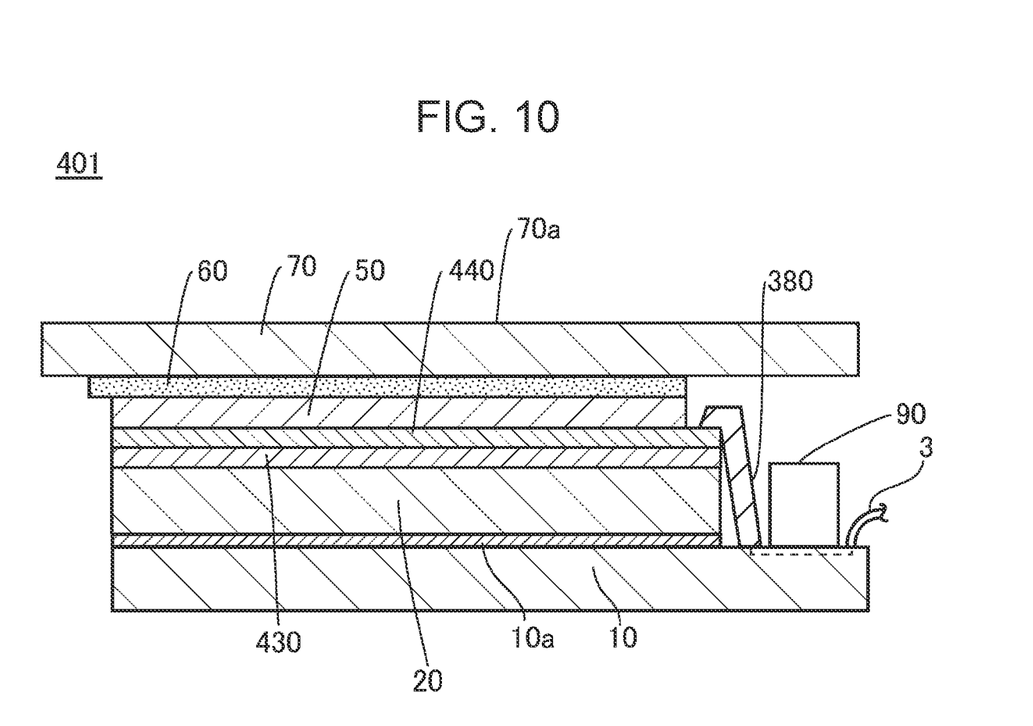
FIG. 10 is a cross-sectional view of an in-cell touch panel according to a modification of the third embodiment.

A configuration of an in-cell touch panel 401 according to a modification of the third embodiment will be described with reference to FIG. 10. FIG. 10 is a cross-sectional view of the in-cell touch panel 401 according to the modification of the third embodiment. Note that configurations that are the same as those in any of the first to third embodiments will be denoted by the same symbols as in one of the first to third embodiments, and description will be omitted.

As illustrated in FIG. 10, the in-cell touch panel 401 includes a shielding layer 430 and a conductive layer 440. The shielding layer 430 is made of a transparent electrode (ITO). For example, the shielding layer 430 is formed on the entire surface of the CF glass 20. The conductive layer 440 is an adhesive layer that has conductivity. In the modification of the third embodiment as well, a sheet resistance value of the conductive layer 440 is lower than a sheet resistance value of the shielding layer 430. According to the modification of the third embodiment, the conductive layer 440 can be formed by a roll-to-roll process, and accordingly the load involved in manufacturing can be reduced as compared to a case in which film formation of the conductive layer is performed. Other configurations and effects of the modification of the third embodiment are the same as those of the first to third embodiments.

While embodiments have been described above, the above-described embodiments are merely examples for carrying out the present disclosure. Accordingly, the present disclosure is not limited to the above-described embodiments, and the above embodiments can be variously modified and carried out as appropriate without departing from the spirit thereof.

(1) Although an example in which the shielding layer and the conductive layer are brought into contact has been described in the first to third embodiments, the present disclosure is not limited thereto. For example, another member (layer) having different conductivity may be disposed between the shielding layer and the conductive layer, and it is sufficient for the shielding layer and the conductive layer to be electrically connected.

(2) Although an example in which the reference potential is a ground potential has been described in the first to third embodiments, the present disclosure is not limited thereto. For example, the reference potential may be a predetermined potential other than the ground potential.

(3) Although an example in which the conductive layer is configured as a transparent electrode has been described in the first embodiment, the present disclosure is not limited thereto. The conductive layer may be formed of a conductive material that is not transparent. For example, the conductive layer may be formed of a metal material such as copper, silver, gold, or the like.

(4) Although an example in which the frame region is formed in a rectangular frame-like shape has been described in the first to third embodiments, the present disclosure is not limited thereto. The frame region may be formed in circular, elliptical, or polygonal frame-like shapes, or the frame region may be rectangular and have only three sides (U shape).

(5) Although specific examples of the sheet resistance value of the conductive layer and the sheet resistance value of the shielding layer have been described in the first to third embodiments, the present disclosure is not limited thereto. It is sufficient for the sheet resistance value of the conductive layer to be lower than the sheet resistance value of the shielding layer.

(6) Although an example in which the conductive layer is disposed only in the frame region has been described in the first to third embodiments, the present disclosure is not limited thereto. For example, part of the conductive layer may be disposed in the touch detection region.

(7) Although an example in which the conductive layer has a U shape or a frame-like shape in plan view has been described in the first to third embodiments, the present disclosure is not limited thereto. For example, the conductive layer may be provided on one or two of the four sides of the frame region having a frame-like shape.

(8) Although an example in which the shielding layer is formed so as to cover part of the CF glass has been described in the first to third embodiments, the present disclosure is not limited thereto. For example, the shielding layer may be formed so as to cover the entire surface of the CF glass.

Figure 11:
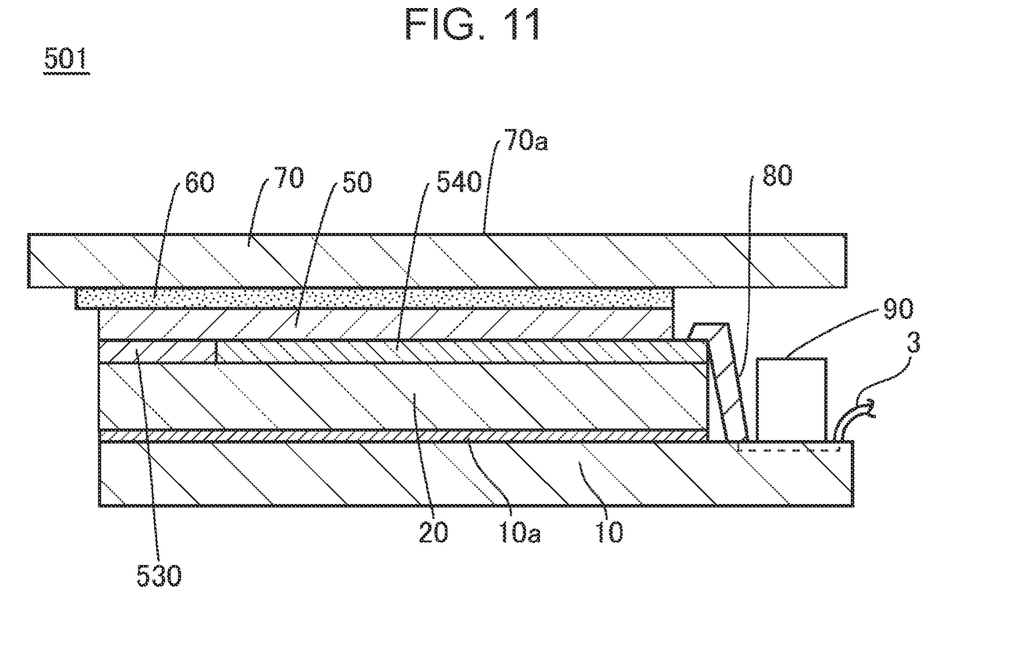
FIG. 11 is a cross-sectional view of an in-cell touch panel according to a first modification of the first to third embodiments.
Figure 12:
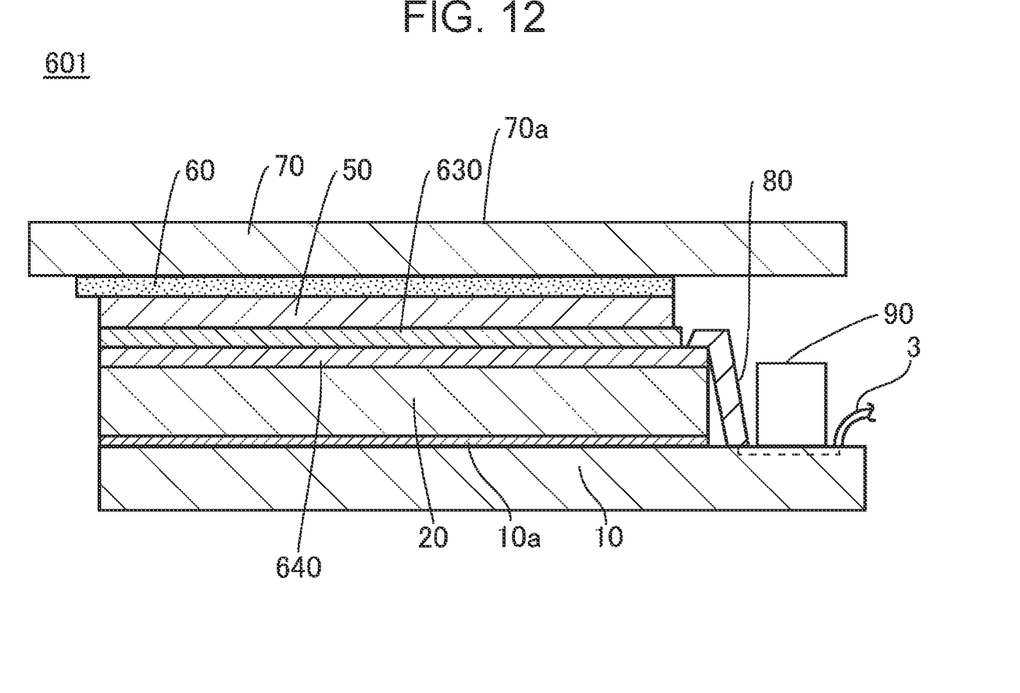
FIG. 12 is a cross-sectional view of an in-cell touch panel according to a second modification of the first to third embodiments.

(9) Although an example in which the conductive layer is provided on the shielding layer has been described in the first to third embodiments, the present disclosure is not limited thereto. For example, a shielding layer 530 and a conductive layer 540 may be disposed at the same height position, as in an in-cell touch panel 501 according to a first modification illustrated in FIG. 11. Alternatively, a conductive layer 640 may be disposed below a shielding layer 630 as in an in-cell touch panel 601 according to a second modification illustrated in FIG. 12.

The above-described in-cell touch panel can also be described as follows.

An in-cell touch panel according to a first configuration is an in-cell touch panel having a touch surface that is touched by an indicator. The in-cell touch panel includes a touch electrode, a shielding layer that is conductive and that is disposed between the touch electrode and the touch surface, a conductive layer that is electrically connected to the shielding layer, and wiring that connects the conductive layer to a reference potential. The touch surface has a touch detection region that, when touched by the indicator, detects the touch by the touch electrode, and a frame region that is disposed on an outer side of the touch detection region. At least part of the shielding layer is disposed so as to overlap the touch detection region in plan view. At least part of the conductive layer is disposed so as to overlap the frame region in plan view. A sheet resistance value of the conductive layer is lower than a sheet resistance value of the shielding layer (first configuration).

According to the first configuration, the shielding layer that has a higher sheet resistance value is disposed at a position overlapping the touch detection region in plan view, and accordingly deterioration in sensitivity of detecting touching can be suppressed. The conductive layer that has a lower sheet resistance value is electrically connected to the shielding layer, and accordingly, even when the shielding layer is charged with static electricity, the static electricity can be quickly discharged to the wiring (reference potential) via the conductive layer having a lower sheet resistance value. Also, at least part of the conductive layer is disposed so as to overlap the frame region in plan view, and accordingly the effect of the lower sheet resistance value of the conductive layer on touch detection can be reduced. As a result of the above, the effect of static electricity on display and the effect of static electricity on touch detection can be reduced while suppressing deterioration in sensitivity of detecting touching.

In the first configuration, the in-cell touch panel may further include a light-shielding member that is disposed so as to overlap the frame region in plan view, and the conductive layer may be disposed so as to overlap at least part of the light-shielding member in plan view (second configuration).

According to the second configuration, at least part of the conductive layer is disposed in a region in which the light-shielding member is disposed and images are not displayed (non-display region), within the frame region, and accordingly the effect on display due to the conductive layer being disposed can be reduced.

In the first or second configurations, the conductive layer may be in contact with the shielding layer (third configuration).

According to the third configuration, another member for electrically connecting the conductive layer and the shielding layer is unnecessary.

In any one of the first to third configurations, the shielding layer and the conductive layer may each include indium tin oxide (fourth configuration).

Generally, a process of manufacturing an in-cell touch panel includes a step of forming transparent electrodes including indium tin oxide. In contrast, according to the fourth configuration, at the time of film formation of the shielding layer and the conductive layer, an existing device for film formation of transparent electrodes can be shared among steps. When the conductive layer disposed in the frame region is formed from metal, conductive paste, or carbon resin, the thickness of the conductive layer is large, and an air layer (space) is created in the touch detection region. In contrast, forming the conductive layer from indium tin oxide enables the thickness thereof to be reduced, and the air layer (space) can be suppressed from being created in the touch detection region.

In any one of the first to fourth configurations, the in-cell touch panel may further include a polarizer disposed between the shielding layer and the touch surface, and the conductive layer may include a first adhesive layer that bonds to the polarizer and that has conductivity (fifth configuration).

Here, a process of joining films while transporting panels from roll to roll (roll-to-roll process) enables the load involved in manufacturing (time, costs, etc.) to be reduced as compared with methods of film formation. According to the fifth configuration, the conductive layer can be formed by a roll-to-roll process, and accordingly the load involved in manufacturing can be reduced.

In the fifth configuration, the shielding layer may include a second adhesive layer that bonds to the first adhesive layer and that has conductivity, and a sheet resistance value of the first adhesive layer may be lower than a sheet resistance value of the second adhesive layer (sixth configuration).

According to the sixth configuration, both of the shielding layer and the conductive layer can be fabricated by a roll-to-roll process, and accordingly the load involved in manufacturing can be reduced.

According to any one of the first to sixth configurations, the conductive layer may be formed so as to have a U shape in plan view (seventh configuration).

According to the seventh configuration, the conductive layer is formed so as to follow the shape of the frame region having a frame-like shape, and accordingly the conductive layer can be formed so as to surround the touch detection region in a U shape in plan view. As a result, static electricity entering the touch detection region can be released to the frame region, and accordingly a situation in which static electricity is present for a long period of time in the touch detection region can be suppressed.

According to any one of the first to sixth configurations, the conductive layer may be formed so as to have a frame-like shape in plan view, and the wiring may connect to the conductive layer in the frame region (eighth configuration).

According to the eighth configuration, the conductive layer is formed on all sides of the frame region having a frame-like shape, and accordingly the number of connection points between the wiring and the conductive layer can be increased in the frame region. As a result, static electricity can be released from the conductive layer to the wiring more readily. Also, when the in-cell touch panel has a small configuration, providing one conductive member to one side of the frame region having a frame-like shape is sufficient, and in this case, the material for the conductive member can be reduced.

The present disclosure contains subject matter related to that disclosed in Japanese Priority Patent Application JP 2022-124146 filed in the Japan Patent Office on Aug. 3, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An in-cell touch panel having a touch surface that is touched by an indicator, the in-cell touch panel comprising:

a touch electrode;

a shielding layer that is conductive and that is disposed between the touch electrode and the touch surface;

a conductive layer that is electrically connected to the shielding layer; and wiring that connects the conductive layer to a reference potential, wherein the touch surface has a touch detection region that, when touched by the indicator, detects the touch by the touch electrode, and a frame region that is disposed on an outer side of the touch detection region, at least part of the shielding layer is disposed so as to overlap the touch detection region in plan view, at least part of the conductive layer is disposed so as to overlap the frame region in plan view, and a sheet resistance value of the conductive layer is lower than a sheet resistance value of the shielding layer.

2. The in-cell touch panel according to claim 1, further comprising:

a light-shielding member that is disposed so as to overlap the frame region in plan view, wherein the conductive layer is disposed so as to overlap at least part of the light-shielding member in plan view.

3. The in-cell touch panel according to claim 1, wherein the conductive layer is in contact with the shielding layer.

4. The in-cell touch panel according to claim 1, wherein the shielding layer and the conductive layer each include indium tin oxide.

5. The in-cell touch panel according to claim 1, further comprising:

a polarizer disposed between the shielding layer and the touch surface, wherein the conductive layer includes a first adhesive layer that bonds to the polarizer and that has conductivity.

6. The in-cell touch panel according to claim 5, wherein the shielding layer includes a second adhesive layer that bonds to the first adhesive layer and that has conductivity, and a sheet resistance value of the first adhesive layer is lower than a sheet resistance value of the second adhesive layer.

7. The in-cell touch panel according to claim 1, wherein the conductive layer has a U shape in plan view.

8. The in-cell touch panel according to claim 1, wherein the conductive layer has a frame-like shape in plan view, and the wiring connects to the conductive layer in the frame region.

* * * * *